US011475285B2

(12) United States Patent
Kang et al.

(10) Patent No.: US 11,475,285 B2
(45) Date of Patent: Oct. 18, 2022

(54) NEURAL NETWORK ACCELERATOR AND OPERATING METHOD THEREOF

(71) Applicant: SAMSUNG ELECTRONICS CO., LTD., Suwon-si (KR)

(72) Inventors: Seokhyeong Kang, Pohang-si (KR); Yesung Kang, Ulsan (KR); Sunghoon Kim, Seoul (KR); Yoonho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 16/751,503

(22) Filed: Jan. 24, 2020

(65) Prior Publication Data

US 2020/0242456 A1 Jul. 30, 2020

(30) Foreign Application Priority Data

Jan. 28, 2019 (KR) .................. 10-2019-0010293
Mar. 26, 2019 (KR) .................. 10-2019-0034583

(51) Int. Cl.
*G06F 9/50* (2006.01)
*G06N 3/063* (2006.01)
*G06F 9/30* (2018.01)

(52) U.S. Cl.
CPC .......... *G06N 3/063* (2013.01); *G06F 9/30145* (2013.01); *G06F 9/5027* (2013.01)

(58) Field of Classification Search
CPC .... G06N 3/063; G06F 9/30145; G06F 9/5027
See application file for complete search history.

(56) References Cited

U.S. PATENT DOCUMENTS

| 9,916,531 | B1* | 3/2018 | Zivkovic | G06N 3/08 |
| 11,200,186 | B2* | 12/2021 | Fleming, Jr. | G06F 13/4027 |
| 2020/0242456 | A1* | 7/2020 | Kang | G06N 3/063 |
| 2020/0380370 | A1* | 12/2020 | Lie | G06F 7/49915 |

OTHER PUBLICATIONS

Kang, Analysis and Solution of CNN Accuracy Reduction over Channel Loop Tiling, 2020, IEEE, pp. 1-6. (Year: 2020).*
Yu-Hsin Chen, et al., "Eyeriss: An Energy-Efficient Reconfigurable Accelerator for Deep Convolutional Neural Networks", IEEE Journal of Solid-State Circuits, 2016.

(Continued)

*Primary Examiner* — Cheng Yuan Tseng
(74) *Attorney, Agent, or Firm* — NSIP Law

(57) ABSTRACT

A neural network accelerator includes an operator that calculates a first operation result based on a first tiled input feature map and first tiled filter data, a quantizer that generates a quantization result by quantizing the first operation result based on a second bit width extended compared with a first bit width of the first tiled input feature map, a compressor that generates a partial sum by compressing the quantization result, and a decompressor that generates a second operation result by decompressing the partial sum, the operator calculates a third operation result based on a second tiled input feature map, second tiled filter data, and the second operation result, and an output feature map is generated based on the third operation result.

16 Claims, 7 Drawing Sheets

(56) References Cited

OTHER PUBLICATIONS

Eunhyeok Park, et al., "Energy-efficient Neural Network Accelerator Based on Outlier-aware Low-precision Computation", 2018 ACM/IEEE 45th Annual International Symposium on Computer Architecture, 2018.

Shubham Jain, et al., "Compensated-DNN: Energy Efficient Low-Precision Deep Neural Networks by Compensating Quantization Errors", 2018.

Yesung Kang, et al., "analysis and solution of cnn accuracy reduction over channel loop tiling", The 1st conference on Semiconductors, 2018.

\* cited by examiner

NEURAL NETWORK ACCELERATOR AND OPERATING METHOD THEREOF

CROSS-REFERENCE TO RELATED APPLICATIONS

This application claims priority under 35 U.S.C. § 119 to Korean Patent Application Nos. 10-2019-0010293, filed on Jan. 28, 2019, and 10-2019-0034583 filed on Mar. 26, 2019, in the Korean Intellectual Property Office, the disclosures of which are incorporated by reference herein in their entireties.

BACKGROUND

Embodiments of the inventive concept described herein relate to a semiconductor device, and more particularly, relate to a neural network accelerator operating based on channel loop tiling of a neural network and an operating method thereof.

A convolutional neural network (CNN) is widely used in an artificial intelligence (AI) application field, in particular, in image recognition, detection, and segmentation. The accuracy of CNN is improved, but a network size, the number of times of calculation, and a memory usage are increased. Even though there are a lot of attempts to reduce the network size, a high-tech CNN requires a memory of tens to hundreds megabytes. An on-chip memory capacity of a neural network accelerator is increasing but is still very small to handle the CNN.

Loop tiling may be performed such that the CNN is capable of being implemented on a hardware platform. The loop tiling means segmenting the CNN into a plurality of blocks. In the case where the CNN is tiled, the segmented CNN block may be accommodated in the on-chip memory. That is, the loop tiling may allow a relatively large CNN to be implemented at the neural network accelerator. However, the loop tiling may cause repeated data movement between an on-chip memory and an off-chip memory. An increase in the data movement may cause a bottleneck phenomenon, thereby reducing a data throughput and an energy efficiency. Also, in the case where an error occurs as a channel loop is tiled, the accuracy of calculation of the neural network accelerator may decrease.

SUMMARY

Embodiments of the inventive concept provide a neural network accelerator for improving the accuracy of calculation which decreases due to an error according to channel loop tiling and an operating method thereof.

According to an exemplary embodiment, a neural network accelerator includes an operator that calculates a first operation result based on a first tiled input feature map and first tiled filter data, a quantizer that generates a quantization result by quantizing the first operation result based on a second bit width extended compared with a first bit width of the first tiled input feature map, a compressor that generates a partial sum by compressing the quantization result, and a decompressor that generates a second operation result by decompressing the partial sum, the operator calculates a third operation result based on a second tiled input feature map, second tiled filter data, and the second operation result, and an output feature map is generated based on the third operation result.

In an embodiment, the operator may include a multiplier that generates a multiplication result by multiplying the second tiled input feature map and the second tiled filter data, and an accumulator that generates the third operation result by adding the multiplication result and the second operation result.

In an embodiment, the quantizer may quantize the first operation result through a round-off.

In an embodiment, the quantization result may include a sign bit and remaining bits composed of an integer part and a fractional part, and a bit width of at least one of the integer part and the fractional part may be extended depending on the second bit width.

In an embodiment, the compressor may include absolute value generation logic that generates an absolute value of partial bits of the remaining bits of the quantization result, and a run-length encoder that generates compression bits by performing run-length encoding based on the generated absolute value.

In an embodiment, the partial bits may be selected in the order from an upper bit to a lower bit of the remaining bits based on a difference between the first bit width and the second bit width.

In an embodiment, the partial sum may include the compression bits generated from the run-length encoder and remaining bits of the quantization result other than the partial bits.

In an embodiment, the compressor may store the generated partial sum in an external memory, and the decompressor may receive the stored partial sum from the external memory.

In an embodiment, the quantizer may generate the output feature map by quantizing the third operation result based on the first bit width.

According to an exemplary embodiment, an operation method of a neural network accelerator which operates based on channel loop tiling includes generating a first operation result based on a first tiled input feature map and first tiled filter data, generating a first quantization result by quantizing the first operation result based on a second bit width extended compared with a first bit width of the first tiled input feature map, generating a first partial sum by compressing the first quantization result, storing the generated first partial sum in an external memory, and generating a second operation result based on a second tiled input feature map, second tiled filter data, and the first partial sum provided from the external memory.

In an embodiment, the generating of the second operation result may include generating a multiplication result by multiplying the second tiled input feature map and the second tiled filter data, and generating the second operation result by adding the multiplication result and the first operation result.

In an embodiment, the method may further include, when the second tiled input feature map and the second tiled filter data are not data lastly received, generating a second quantization result by quantizing the second operation result based on the second bit width, generating a second partial sum by compressing the second quantization result, storing the generated second partial sum in the external memory, and generating a third operation result based on a third tiled input feature map, third tiled filter data, and the second partial sum provided from the external memory.

In an embodiment, the method may further include, when the second tiled input feature map and the second tiled filter data are data lastly received, generating a third quantization result by quantizing the second operation result based on the first bit width, and generating an output feature map based on the third quantization result.

In an embodiment, the first quantization result may include a sign bit and remaining bits composed of an integer part and a fractional part, and a bit width of at least one of the integer part and the fractional part may be extended depending on the second bit width.

In an embodiment, the generating of the first partial sum may include generating an absolute value of partial bits of the remaining bits of the first quantization result, and performing run-length encoding based on the generated absolute value.

In an embodiment, the partial bits may be selected in the order from an upper bit to a lower bit of the remaining bits based on a difference between the first bit width and the second bit width.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Hereinafter, embodiments of the inventive concept are described in detail with reference to the accompanying drawings. In the following description, specific details such as detailed components and structures are merely provided to assist the overall understanding of the embodiments of the inventive concept. Therefore, it should be apparent to those skilled in the art that various changes and modifications of the embodiments described herein may be made without departing from the scope and spirit of the present invention. In addition, descriptions of well-known functions and structures are omitted for clarity and conciseness. The terms described below are terms defined in consideration of the functions in the inventive concept and are not limited to a specific function. The definitions of the terms should be determined based on the contents throughout the specification.

In the following drawings or in the detailed description, modules may be connected with any other components other than components illustrated in drawings below or described in the detailed description. Modules or components may be connected directly or indirectly. Modules or components may be connected through communication or may be physically connected.

Components that are described in the detailed description with reference to the terms "unit", "module", "layer", "logic", etc. will be implemented with software, hardware, or a combination thereof. For example, the software may be a machine code, firmware, an embedded code, and application software. For example, the hardware may be implemented with an electrical circuit, an electronic circuit, a processor, a computer, an integrated circuit, integrated circuit cores, a pressure sensor, an inertial sensor, a microelectromechanical system (MEMS), a passive element, or a combination thereof.

Unless otherwise defined, all terms used herein, which include technical terminologies or scientific terminologies, have the same meaning as that understood by a person skilled in the art to which the present invention belongs. Terms defined in a generally used dictionary are to be interpreted to have meanings equal to the contextual meanings in a relevant technical field, and are not interpreted to have ideal or excessively formal meanings unless clearly defined in the specification.

Figure 1:
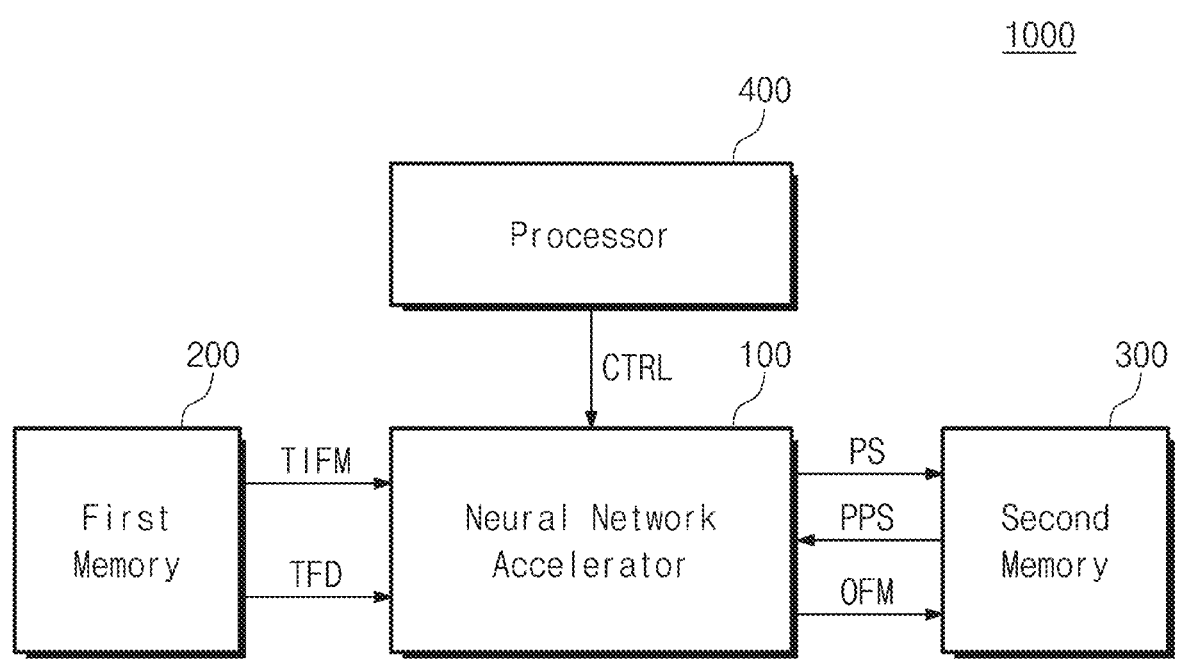
FIG. 1 illustrates a block diagram of an accelerator system according to an embodiment of the inventive concept.

FIG. 1 illustrates a block diagram of an accelerator system according to an embodiment of the inventive concept. An accelerator system 1000 may operate based on the CNN. For example, the accelerator system 1000 may generate an output feature map OFM based on an input feature map and filter (or weight/kernel) data.

In the case where the size of the input feature map and the filter data are large, the accelerator system 1000 may perform channel loop tiling. The input feature map and filter data may be segmented into a plurality of blocks depending on the channel loop tiling. The accelerator system 1000 may sequentially process the segmented blocks of the input feature map and the segmented blocks of the filter data and may generate the output feature map OFM. Below, one segmented block of the input feature map is referred to as a "tiled input feature map TIFM", and one segmented block of the filter data is referred to as "tiled filter data TFD". As such, the accelerator system 1000 may generate the output feature map OFM based on the tiled input feature map TIFM and the tiled filter data TFD.

The accelerator system 1000 includes a neural network accelerator 100, a first memory 200, a second memory 300, and a processor 400. The neural network accelerator 100 may operate based on a control signal CTRL from the processor 400. The neural network accelerator 100 may generate the output feature map OFM in response to the control signal CTRL.

In detail, the neural network accelerator 100 may receive the tiled input feature map TIFM and the tiled filter data TFD from the first memory 200. The neural network accelerator 100 may generate a partial sum PS based on the tiled input feature map TIFM and the tiled filter data TFD. Here, the partial sum PS may be data that are calculated by performing a convolution operation on the input feature map and the filter data. The neural network accelerator 100 may store the generated partial sum PS in the second memory 300. Afterwards, in the case where a new tiled input feature map TIFM and a new tiled filter data TFD are provided from the first memory 200, the neural network accelerator 100 may generate a new partial sum PS based on the tiled input feature map TIFM, the tiled filter data TFD, and a previous partial sum PPS provided from the second memory 300. Here, the previous partial sum PPS may be data identical to the partial sum PS stored in the second memory 300. Alternatively, the neural network accelerator 100 may generate the output feature map OFM based on the tiled input feature map TIFM, the tiled filter data TFD, and the previous partial sum PPS.

The first memory 200 may store the input feature map and the filter data. In this case, the input feature map and the filter data may be stored in the form of being tiled by the processor 400. The first memory 200 may provide the tiled input feature map TIFM and the tiled filter data TFD to the neural network accelerator 100.

The second memory 300 may store the partial sum PS provided from the neural network accelerator 100. The second memory 300 may output the stored partial sum PS in response to a request of the neural network accelerator 100 so as to be provided to the neural network accelerator 100 as the previous partial sum PPS. The second memory 300 may store the output feature map OFM provided from the neural network accelerator 100. The output feature map OFM may be used as the input feature map at another layer of the CNN. An example is illustrated in FIG. 1 as the first memory 200 and the second memory 300 are independent of each other, but the inventive concept is not limited thereto. The first memory 200 and the second memory 300 may be implemented with one memory.

For example, each of the first memory 200 and the second memory 300 may be implemented with a volatile memory such as a register, a static random access memory (SRAM) or a dynamic random access memory (DRAM), or a non-volatile memory such as a read only memory (ROM), a flash memory, a resistance random access memory (ReRAM) or a magnetic random access memory (MRAM).

Figure 2:
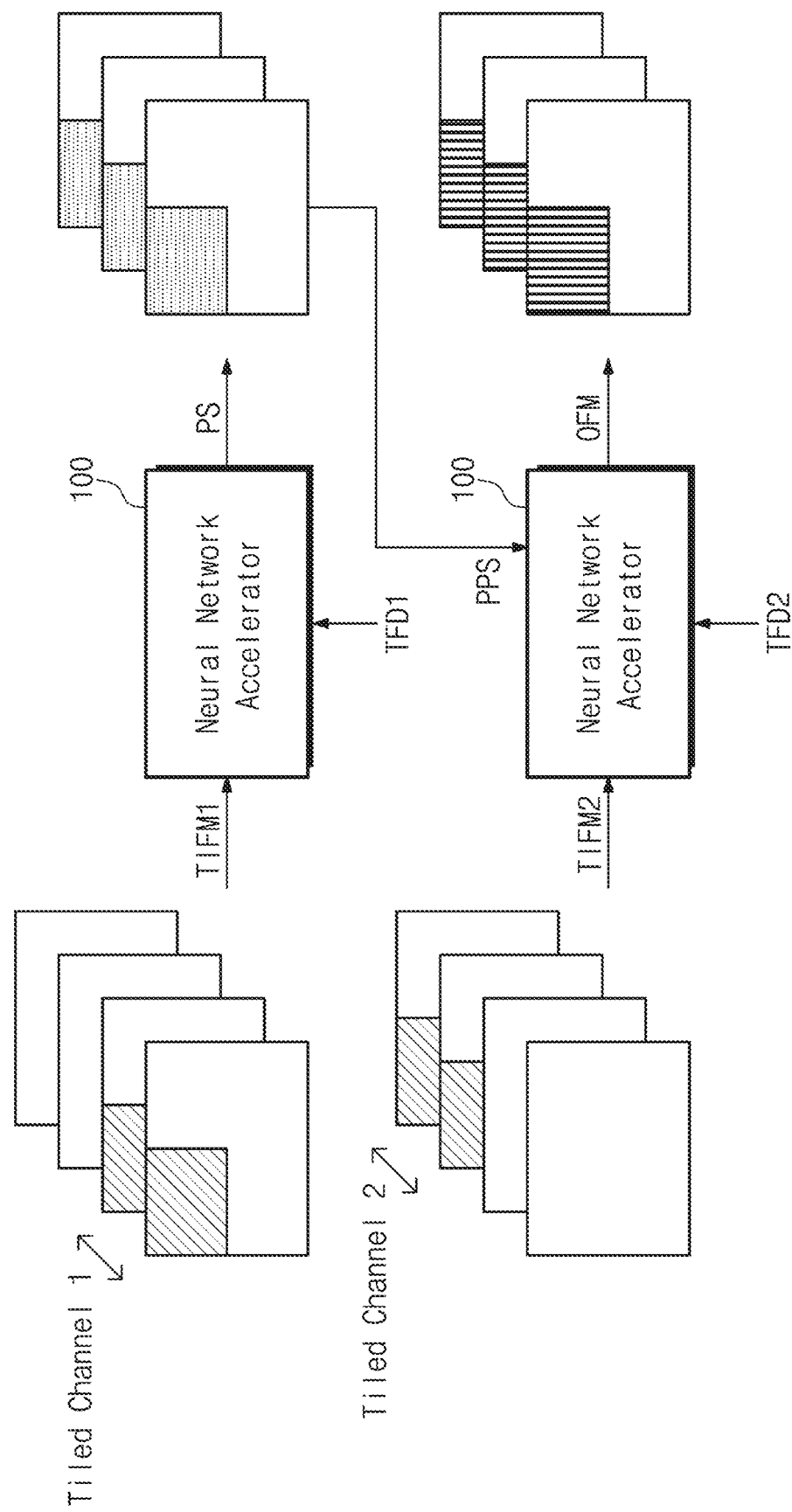
FIG. 2 illustrates an example in which a neural network accelerator of FIG. 1 generates an output feature map.

FIG. 2 illustrates an example in which the neural network accelerator 100 of FIG. 1 generates an output feature map. Referring to FIG. 2, an input feature map may be segmented into a first tiled input feature map TIFM1 and a second tiled input feature map TIFM2, and filter data may be segmented into first tiled filter data TFD1 and second tiled filter data TFD2.

In the case where the first tiled input feature map TIFM1 and the first tiled filter input TFD1 are provided, the neural network accelerator 100 may generate the partial sum PS based on the first tiled input feature map TIFM1 and the first tiled filter data TFD1. The generated partial sum PS may be stored in an external memory (e.g., the second memory 300 of FIG. 1).

Afterwards, in the case where the second tiled input feature map TIFM2 and the second tiled filter input TFD2 are provided, the neural network accelerator 100 may generate the output feature map OFM based on the second tiled input feature map TIFM2, the second tiled filter data TFD2, and the previous partial sum PPS from the external memory. In this case, the previous partial sum PPS may be data identical to the partial sum PS.

The description is given with reference to FIG. 2 as the output feature map OFM is generated from the firstly generated partial sum PS, but the inventive concept is not limited thereto. For example, in the case where an input feature map is segmented into two tiled input feature maps, the neural network accelerator 100 may generate a second partial sum PS based on a first partial sum PS. The neural network accelerator 100 may generate the output feature map OFM based on the second partial sum PS. That is, the neural network accelerator 100 may stepwise generate the partial sum PS depending on a tiling count and may generate the output feature map OFM based on the partial sum PS thus generated.

As described above, the accelerator system 1000 may tile an input feature map and filter data based on the channel loop tiling. In the case where the input feature map and the filter data are tiled, even though the size of the input feature map and the filter data is large, the input feature map and the filter data may be accommodated in the on-chip memory of the neural network accelerator 100. In the case where the output feature map OFM is generated based on the channel loop tiling, the partial sum PS may be generated from the neural network accelerator 100, and the generated partial sum PS may be stored in an external memory. The partial sum PS stored in the external memory may be provided to the neural network accelerator 100 as the previous partial sum PPS for the purpose of generating the output feature map OFM. As such, there may be required a space of the external memory for storing the partial sum PS, and there may occur communication overhead according to the exchange of the partial sum PS between the neural network accelerator 100 and the external memory.

The neural network accelerator 100 according to an embodiment of the inventive concept may minimize a necessary space of the external memory for storing the partial sum PS. As such, an increase in the communication overhead between the neural network accelerator 100 and the external memory may be minimized.

Also, in the case where the partial sum PS is generated due to the channel loop tiling, quantization and compression may be performed to reduce a memory usage and communication overhead. In this case, the quantization and compression may cause a decrease in the accuracy of calculation of the neural network accelerator 100. The neural network accelerator 100 according to an embodiment of the inventive concept may restore the accuracy of calculation that is reduced as an input feature map and filter data are tiled.

Below, an operation of the neural network accelerator 100 will be more fully described with reference to FIGS. 3 to 7.

Figure 3:
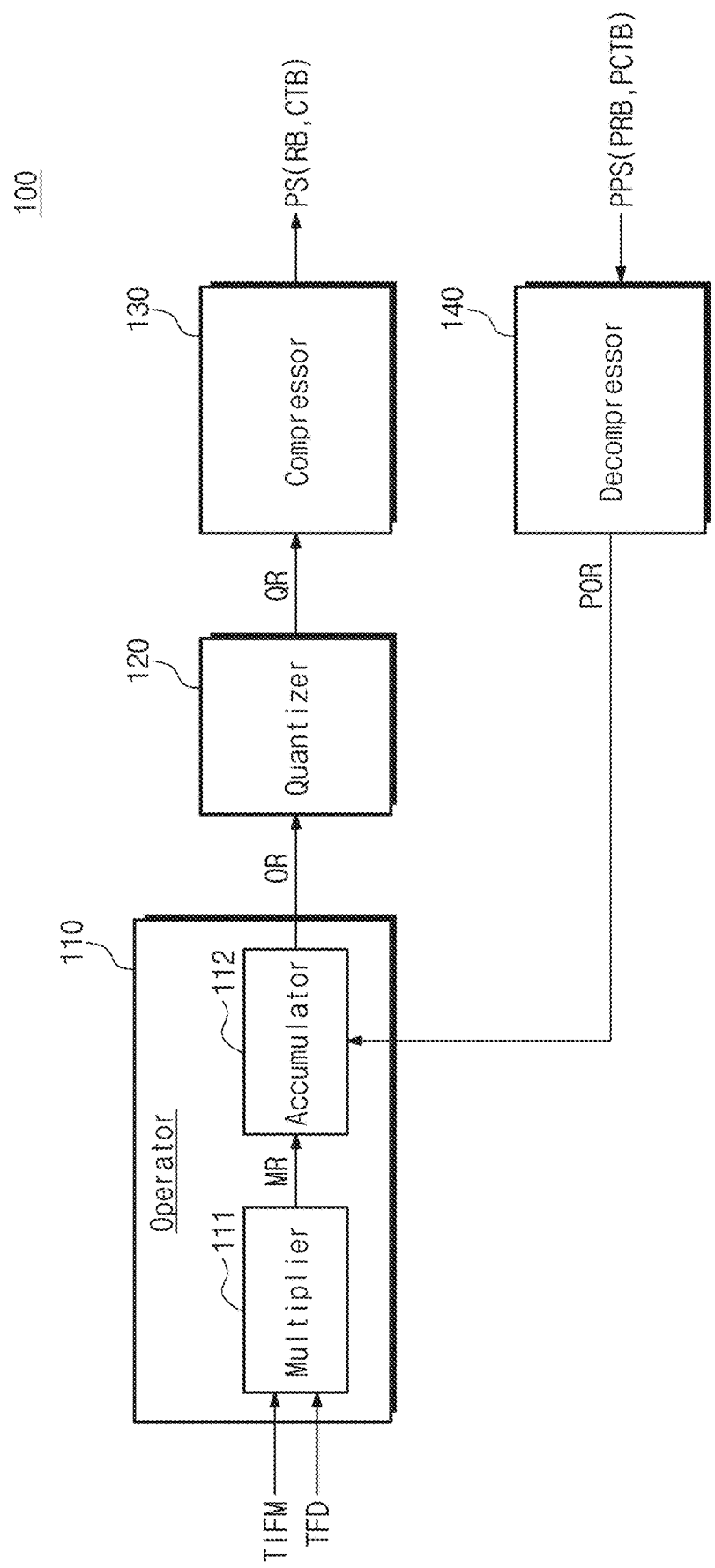
FIG. 3 illustrates a block diagram of a neural network accelerator of FIG. 1.

FIG. 3 illustrates a block diagram of a neural network accelerator of FIG. 1. Referring to FIG. 3, the neural network accelerator 100 may include an operator 110, a quantizer 120, a compressor 130, and a decompressor 140. The operator 110 may include a multiplier 111 and an accumulator 112.

The operator 110 may generate an operation result OR based on the tiled input feature map TIFM, the tiled filter data TFD, and a previous operation result POR from the decompressor 140. In the case where the tiled input feature map TIFM and the tiled filter data TFD are provided for the first time, because the previous operation result POR does not exist, the operator 110 may generate the operation result OR based on the tiled input feature map TIFM and the tiled filter data TFD.

In detail, the multiplier 111 may multiply the tiled input feature map TIFM and the tiled filter data TFD to generate a multiplication result MR. The accumulator 112 may add the multiplication result MR and the previous operation result POR to generate the operation result OR. In the case where the previous operation result POR does not exist, the accumulator 112 may output the multiplication result MR as the operation result OR.

A bit width of the multiplier 111 and the accumulator 112 may be set depending on a bit width of each of the tiled input feature map TIFM and the tiled filter data TFD. For example, in the case where a bit width of each of the tiled input feature map TIFM and the tiled filter data TFD is 8-bit, the bit width of the multiplier 111 may be set to perform 8-bit multiplication. In the case where a 16-bit multiplication result MR is output from the multiplier 111 as a result of the 8-bit multiplication, the bit width of the accumulator 112 may be set to perform 16-bit addition. That is, the bit width of the multiplier 111 and the accumulator 112 may be set to a range capable of preventing an overflow.

The quantizer 120 may receive the operation result OR from the operator 110. The quantizer 120 may quantize the operation result OR based on a given bit width or based on an extended bit width. Here, the given bit width and the extended bit width may be smaller than the bit width of the operation result OR, and the extended bit width may be greater than the given bit width. The given bit width may be identical to the bit width of the tiled input feature map TIFM or the bit width of the output feature map OFM. In this case, the bit width of the tiled input feature map TIFM may be identical to the bit width of the output feature map OFM. For example, the bit width of the operation result OR may be 16-bit, the given bit width may be 8-bit, and the extended bit width may be 10-bit.

For example, to generate the output feature map OFM, in the case where the last tiled input feature map TIFM and the last tiled filter data TFD are provided, the quantizer 120 may quantize the operation result OR based on the given bit width to generate a quantization result QR. In this case, the output feature map OFM may be generated based on the quantization result QR. In the case where the tiled input feature map TIFM and the tiled filter data TFD provided to the quantizer 120 are not the last tiled input feature map TIFM and the last tiled filter data TFD, the quantizer 120 may quantize the operation result OR based on the extended bit width to generate the quantization result QR.

A quantization operation of the quantizer 120 will be more fully described with reference to FIGS. 4 and 5.

The compressor 130 may compress the quantization result QR to generate the partial sum PS. In this case, the number of bits of the partial sum PS may be less than the number of bits of the quantization result QR. In the compression, the compressor 130 may divide bits of the quantization result QR into partial bits and remaining bits RB. The compressor 130 may perform encoding on the partial bits to generate compression bits CTB. For example, the compressor 130 may perform run-length encoding on the partial bits. As such, the partial sum PS generated from the compressor 130 may include the remaining bits RB and the compression bits CTB.

A compression operation of the compressor 130 will be more fully described with reference to FIGS. 4 and 6.

The decompressor 140 may decompress the previous partial sum PPS to generate the previous operation result POR. Because the partial sum PS includes the remaining bits RB and the compression bits CTB, the previous partial sum PPS may include previous remaining bits PRB and previous compression bits PCTB. In this case, the previous remaining bits PRB may be identical to the remaining bits RB, and the previous compression bits PCTB may be identical to the compression bits CTB.

The decompressor 140 may decompress the previous partial sum PPS based on a compression manner of the compressor 130. For example, the decompressor 140 may perform run-length decoding on the previous compression bits PCTB to generate partial bits. The decompressor 140 may combine the generated partial bits and the previous remaining bits PRB to generate the previous operation result POR. In this case, the decompressor 140 may generate the previous operation result POR having the same bit width as the bit width of the multiplication result MR.

Figure 4:
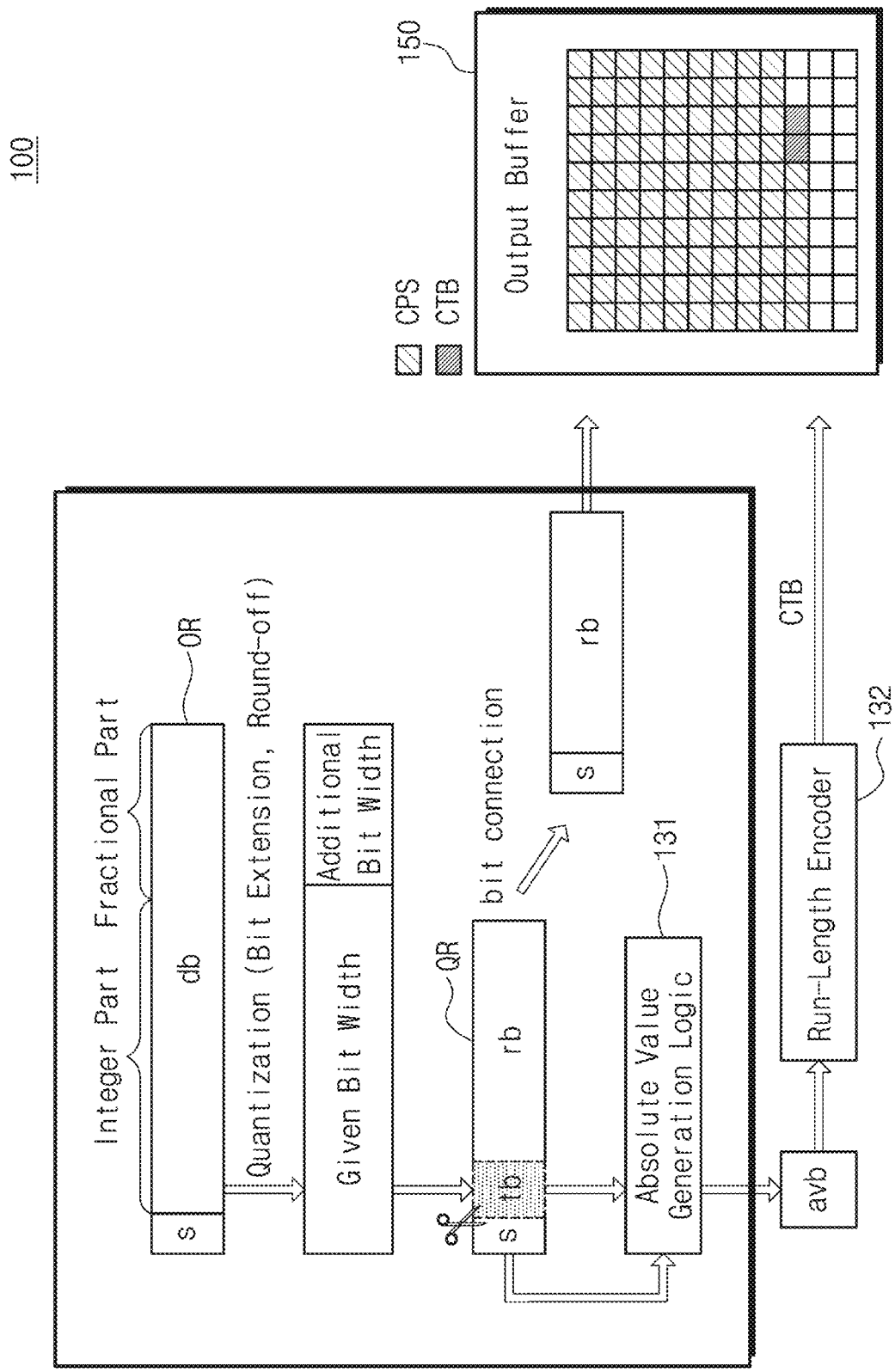
FIG. 4 is a diagram illustrating an example of operations of a quantizer and a compressor of FIG. 3.

FIG. 4 is a diagram illustrating an example of operations of a quantizer and a compressor of FIG. 3. Referring to FIGS. 3 and 4, the operation result OR generated from the operator 110 may include a sign bit "s" and remaining bits db. For example, the operation result OR may be expressed by a fixed point. In this case, the remaining bits db may be composed of an integer part and a fractional part. The integer part may indicate a range of a number that the operation result OR indicates, and the fractional part may indicate a precision.

The quantizer 120 may quantize the operation result OR through bit extension and round-off. The quantizer 120 may increase a bit width so as to be greater than the given bit width as much as an additional bit width and may quantize the operation result OR to the extended bit width. In this case, a bit width of the integer part may be increased, or a bit width of the fractional part may be increased. For example, the integer part may be extended as much as 2 bits. Alternatively, each of the integer part and the fractional part may be extended as much as one bit. In the case where the bit width is extended depending on the additional bit width, the accuracy of calculation may be increased. Accordingly, the additional bit width may vary depending on the required accuracy of calculation.

In the case where the operation result OR is quantized, the quantization result QR may be generated. The quantization result QR may include a sign bit "s", partial bits tb, and remaining bits rb. The compressor 130 may separate the partial bits tb from the quantization result QR. The compressor 130 may connect the sign bit "s" and the remaining bits rb to generate the remaining bits RB of FIG. 3. In this case the partial bits tb may be selected from bits other than the sign bit "s" in the order from an upper bit to a lower bit. A bit width of the partial bits tb may be identical to the additional bit width.

The compressor 130 may generate an absolute value of the partial bits tb through absolute value generation logic 131. The absolute value generation logic 131 may be included in the compressor 130. For example, the absolute value generation logic 131 may calculate an absolute value of the partial bits tb by performing an exclusive OR (XOR) operation on the sign bit "s" and the partial bits tb. As such, absolute value bits avb may be generated.

The compressor 130 may encode the absolute value bits avb through a run-length encoder 132 to generate the compression bits CTB. The run-length encoder 132 may be included in the compressor 130. For example, in the case where the absolute value bits avb are "00000", the run-length encoder 132 may generate "0" as a run value and may generate "5" as a length value. As such, the number of compression bits CTB thus generate may be less than the number of absolute value bits avb.

The remaining bits RB and the compression bits CTB generated from the compressor 130 may be stored in an output buffer 150. The output buffer 150 may be a memory in which the partial sum PS generated through the compressor 130 is temporarily stored before being provided to an external memory. That is, the neural network accelerator 100 may further include the output buffer 150, but the inventive concept is not limited thereto.

Figure 5:
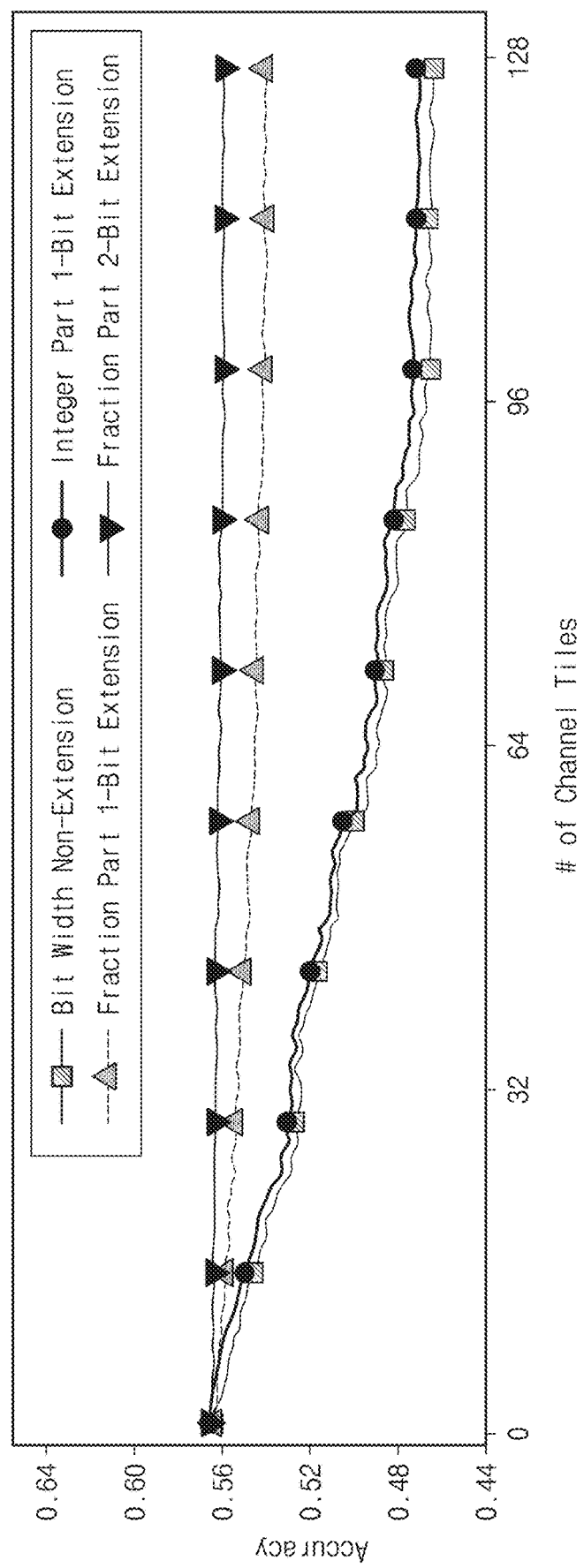
FIG. 5 is a diagram illustrating an example of an effect of bit width extension according to an embodiment of the inventive concept.

FIG. 5 is a diagram illustrating an example of an effect of bit width extension according to an embodiment of the inventive concept. In FIG. 5, a horizontal axis represents the number of channel tiles, and a vertical axis represents the accuracy of calculation. Compared to the case where the bit width is not extended, the accuracy of calculation may be increased when the bit width is extended. Compared to the case where an integer part is extended as much as one bit, the accuracy of calculation may be increased when a fractional part is extended as much as one bit. Also, as the number of extended bits increases, the accuracy of calculation may increase.

In the case where the bit width is not extended, the accuracy of calculation may decrease as the number of channel tiles increases. The reason is that a quantization procedure becomes more complicated as the number of channel tiles increases and an error occurs due to a decrease in the number of bits and the round-off. In the case where the bit width is extended, even though the number of channel tiles increases, the accuracy of calculation may be maintained. Accordingly, a decrease in the accuracy of calculation may be restored in the case where a bit width is extended in the quantization procedure according to an embodiment of the inventive concept.

Figure 6:
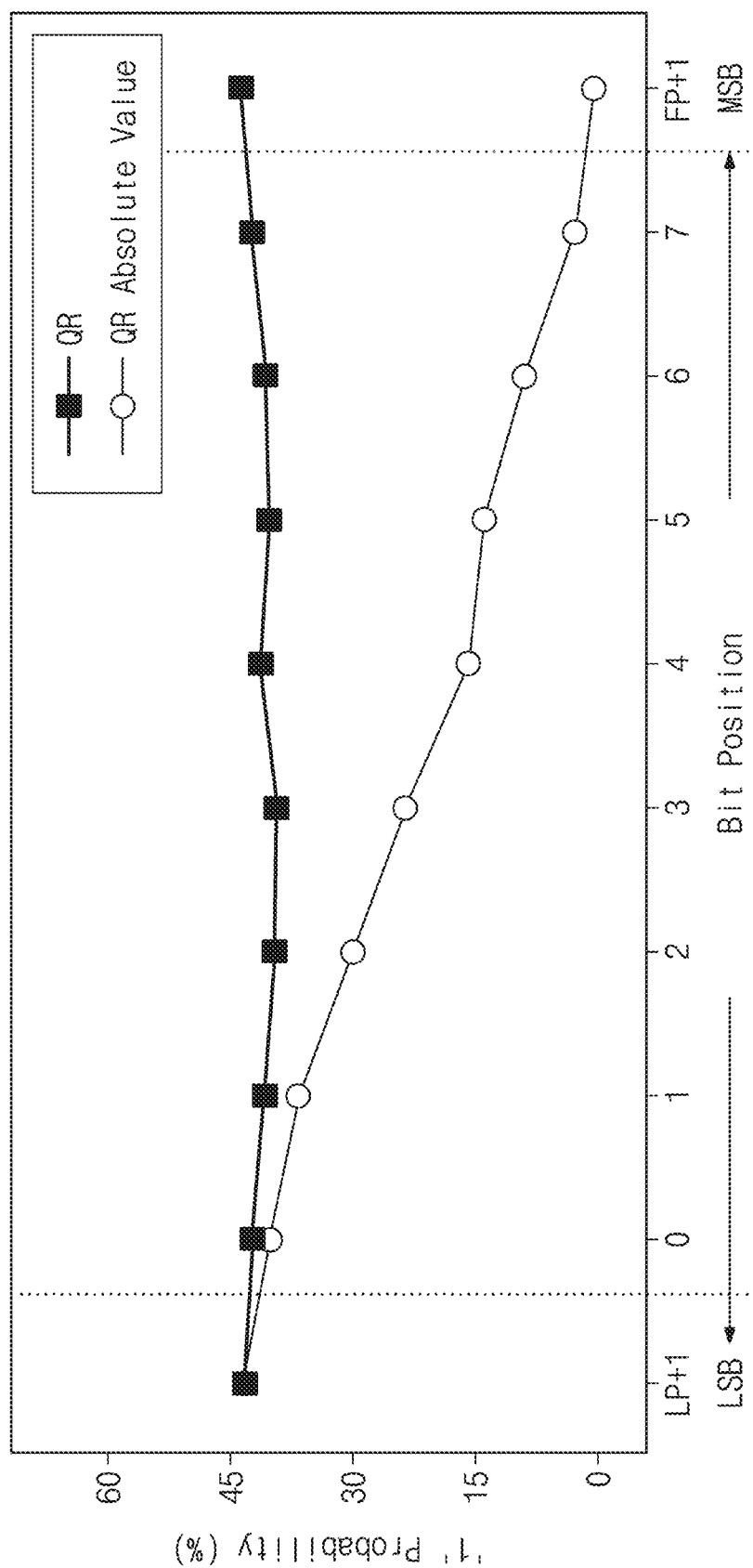
FIG. 6 is a diagram illustrating an example of an effect of absolute value generation according to an embodiment of the inventive concept.

FIG. 6 is a diagram illustrating an example of an effect of absolute value generation according to an embodiment of the inventive concept. Referring to FIG. 6, a horizontal axis represents a bit position of the quantization result QR, and a vertical axis represents the probability that each bit is a value of "1". In detail, the quantization result QR that is generated through one-bit extension at each of the fractional part FP and the integer part IP is illustrated in FIG. 6.

In the case where a sign bit is excluded, the probability that the most significant bit MSB to the least significant bit LSB of the quantization result QR all are a value of "1" may be about 45%. In contrast, the probability that a bit value of an absolute value of the quantization result QR is a value of "1" as it goes toward an upper bit may decrease. That is, in the case of generating an absolute value from upper bits of the quantization result QR, the probability that continuous bits each having a value of "0" are generated may be high.

As such, the compressor 130 may select partial bits tb in the order from an upper bit to a lower bit of the quantization result QR and may generate an absolute value of the partial bits tb. Accordingly, the absolute value bits avb may include continuous bits each having a value of "0". In this case, the efficiency of compression according to the run-length encoding may be improved. In the case where the compression efficiency is improved, a usage of the external memory storing the partial sum PS may be decreased, and the communication overhead between the external memory and the neural network accelerator 100 may be decreased.

Figure 7:
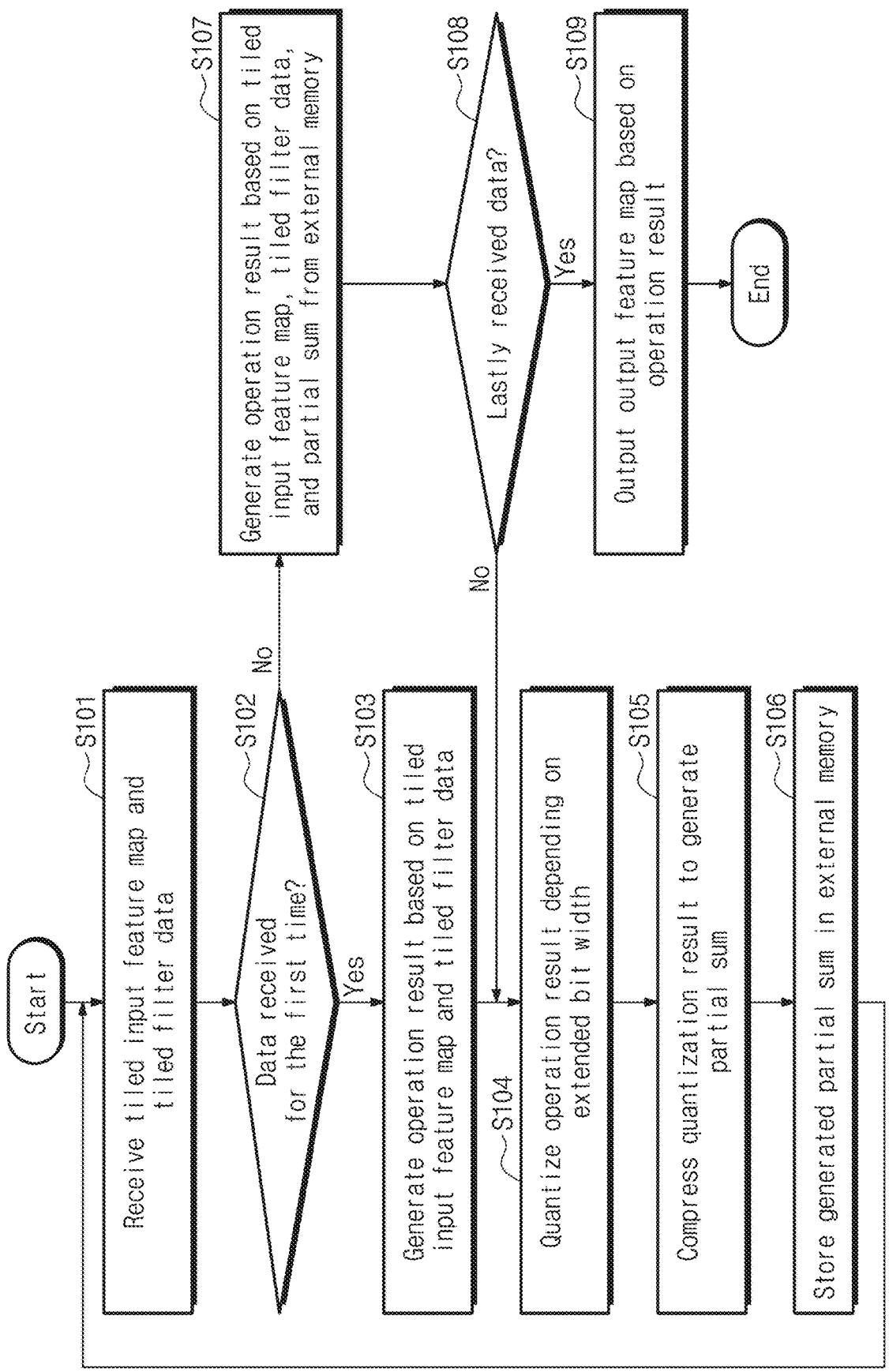
FIG. 7 is a flowchart illustrating an example of an operation of a neural network accelerator according to an embodiment of the inventive concept.

FIG. 7 is a flowchart illustrating an example of an operation of a neural network accelerator according to an embodiment of the inventive concept. Referring to FIGS. 3 and 7, in operation S101, the neural network accelerator 100 may receive the tiled input feature map TIFM and the tiled filter data TFD. In operation S102, the neural network accelerator 100 may determine whether the received data are data received for the first time. When the received data are data received for the first time, in operation S103, the neural network accelerator 100 may generate the operation result OR based on the tiled input feature map TIFM and the tiled filter data TFD. For example, the operation result OR may be the multiplication result MR of the tiled input feature map TIFM and the tiled filter data TFD.

In operation S104, the neural network accelerator 100 may quantize the operation result OR depending on the extended bit width. In this case, the neural network accelerator 100 may quantize the operation result OR through the round-off. The extended bit width may be in advance determined in consideration of the required accuracy of calculation.

In operation S105, the neural network accelerator 100 may compress the quantization result QR to generate the partial sum PS. As described with reference to FIG. 4, the neural network accelerator 100 may generate an absolute value of partial bits of the quantization result QR and may compress the quantization result QR by performing the run-length encoding on bits of the absolute value thus generated.

In operation S106, the neural network accelerator 100 may store the generated partial sum PS in an external memory. Afterwards, in operation S101, the neural network accelerator 100 may receive the tiled input feature map TIFM and the tiled filter data TFD. In this case, the received tiled input feature map TIFM and the received tiled filter data TFD may be different from the data received for the first time.

When the received data are not the data received for the first time, in operation S107, the neural network accelerator 100 may generate the operation result OR based on the tiled input feature map TIFM, the tiled filter data TFD, and the partial sum PS from the external memory. In this case, the partial sum PS from the external memory may be provided to the neural network accelerator 100 as the previous partial sum PPS.

In operation S108, the neural network accelerator 100 may determine whether the tiled input feature map TIFM and the tiled filter data TFD are data lastly received. When the received data are not the data lastly received, the neural network accelerator 100 may generate the partial sum PS through operation S104 to operation S106 and may store the generated partial sum PS in the external memory.

When the received data are the data lastly received, in operation S109, the neural network accelerator 100 may output the output feature map OFM based on the operation result OR. For example, the neural network accelerator 100 may generate the output feature map OFM by quantizing the operation result OR depending on a given bit width. The generated output feature map OFM may be stored in the external memory.

According to the inventive concept, there may be provided a neural network accelerator restoring the loss of the accuracy of calculation decreased due to an error occurring due to the channel loop tiling.

Also, the neural network accelerator according to the inventive concept may minimize a usage of an external memory and may minimize the overhead of communication with the external memory.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A neural network accelerator comprising:
an operator configured to calculate a first operation result based on a first tiled input feature map and first tiled filter data;
a quantizer configured to generate a quantization result by quantizing the first operation result based on a second bit width extended compared with a first bit width of the first tiled input feature map;
a compressor configured to generate a partial sum by compressing the quantization result; and
a decompressor configured to generate a second operation result by decompressing the partial sum,
wherein the operator calculates a third operation result based on a second tiled input feature map, second tiled filter data, and the second operation result, and
wherein an output feature map is generated based on the third operation result.

2. The neural network accelerator of claim 1, wherein the operator includes:

a multiplier configured to generate a multiplication result by multiplying the second tiled input feature map and the second tiled filter data; and an accumulator configured to generate the third operation result by adding the multiplication result and the second operation result.

3. The neural network accelerator of claim 1, wherein the quantizer quantizes the first operation result through a round-off.

4. The neural network accelerator of claim 1, wherein the quantization result includes a sign bit and remaining bits composed of an integer part and a fractional part, and wherein a bit width of at least one of the integer part and the fractional part is extended depending on the second bit width.

5. The neural network accelerator of claim 4, wherein the compressor includes:

absolute value generation logic configured to generate an absolute value of partial bits of the remaining bits of the quantization result; and a run-length encoder configured to generate compression bits by performing run-length encoding based on the generated absolute value.

6. The neural network accelerator of claim 5, wherein the partial bits are selected in the order from an upper bit to a lower bit of the remaining bits based on a difference between the first bit width and the second bit width.

7. The neural network accelerator of claim 5, wherein the partial sum includes the compression bits generated from the run-length encoder and remaining bits of the quantization result other than the partial bits.

8. The neural network accelerator of claim 1, wherein the compressor stores the generated partial sum in an external memory, and wherein the decompressor receives the stored partial sum from the external memory.

9. The neural network accelerator of claim 1, wherein the quantizer generates the output feature map by quantizing the third operation result based on the first bit width.

10. An operation method of a neural network accelerator which operates based on channel loop tiling, the method comprising:

generating a first operation result based on a first tiled input feature map and first tiled filter data;

generating a first quantization result by quantizing the first operation result based on a second bit width extended compared with a first bit width of the first tiled input feature map;

generating a first partial sum by compressing the first quantization result;

storing the generated first partial sum in an external memory; and generating a second operation result based on a second tiled input feature map, second tiled filter data, and the first partial sum provided from the external memory.

11. The method of claim 10, wherein the generating of the second operation result includes:

generating a multiplication result by multiplying the second tiled input feature map and the second tiled filter data; and generating the second operation result by adding the multiplication result and the first operation result.

12. The method of claim 10, further comprising:

when the second tiled input feature map and the second tiled filter data are not data lastly received, generating a second quantization result by quantizing the second operation result based on the second bit width;

generating a second partial sum by compressing the second quantization result;

storing the generated second partial sum in the external memory; and generating a third operation result based on a third tiled input feature map, third tiled filter data, and the second partial sum provided from the external memory.

13. The method of claim 10, further comprising:

when the second tiled input feature map and the second tiled filter data are data lastly received, generating a third quantization result by quantizing the second operation result based on the first bit width; and generating an output feature map based on the third quantization result.

14. The method of claim 10, wherein the first quantization result includes a sign bit and remaining bits composed of an integer part and a fractional part, and wherein a bit width of at least one of the integer part and the fractional part is extended depending on the second bit width.

15. The method of claim 14, wherein the generating of the first partial sum includes:

generating an absolute value of partial bits of the remaining bits of the first quantization result; and performing run-length encoding based on the generated absolute value.

16. The method of claim 15, wherein the partial bits are selected in the order from an upper bit to a lower bit of the remaining bits based on a difference between the first bit width and the second bit width.

* * * * *